United States Patent [19]
Garcia

[11] Patent Number: 5,902,084
[45] Date of Patent: May 11, 1999

[54] COMBINED NUT AND FLANGE FASTENER

[75] Inventor: Jaime E. Garcia, Wexford, Pa.

[73] Assignee: Delta International Machinery Corp., Pittsburgh, Pa.

[21] Appl. No.: 08/997,415

[22] Filed: Dec. 24, 1997

[51] Int. Cl.[6] ............................ F16B 37/08; F16B 43/00
[52] U.S. Cl. .......................... 411/432; 411/428; 411/533; 411/917
[58] Field of Search .................... 411/427, 432, 411/428, 533, 534, 917

[56] References Cited

U.S. PATENT DOCUMENTS

| | | |
|---|---|---|
| 2,562,327 | 7/1951 | Moore . |
| 2,572,042 | 10/1951 | Martin . |
| 4,205,572 | 6/1980 | Weiner . |
| 4,790,703 | 12/1988 | Wing . |
| 4,914,790 | 4/1990 | Kirn . |
| 4,979,857 | 12/1990 | Wing ................................. 411/533 X |
| 4,986,712 | 1/1991 | Fultz ................................. 411/533 X |
| 5,219,255 | 6/1993 | Hussain et al. ......................... 411/432 |
| 5,618,145 | 4/1997 | Kuo . |

*Primary Examiner*—Neill Wilson
*Attorney, Agent, or Firm*—Kirkpatrick & Lockhart LLP

[57] ABSTRACT

A fastener for securing an object to a threaded spindle comprises a nut portion and a flange portion rotatably connected so as to rotate independently. The fastener includes a bore therethrough having threaded and unthreaded regions, the threaded region for securing the fastener to the spindle.

26 Claims, 3 Drawing Sheets

COMBINED NUT AND FLANGE FASTENER

CROSS REFERENCE TO RELATED APPLICATIONS

Not Applicable

FEDERALLY SPONSORED RESEARCH

Not Applicable

BACKGROUND OF THE INVENTION

1. Field of The Invention

The present invention relates to apparatus for fastening objects including, for example, saw blades, cutting discs, and the like, onto threaded spindles. More particularly, the present invention relates to a combined nut and flange fastener for fastening a circular saw blade or abrading disk to the arbor of a table saw.

2. Description of the Invention Background

Typically, a plurality of individual elements are disposed onto the rotatable arbor of powered saws to secure circular saw blades or abrading discs to the arbor. The plurality of elements known in the art are collectively referred to herein as a "fastening assembly". If the elements of the fastening assembly are not properly seated on the arbor, which is essentially a rotatable threaded spindle, the tendency of the blade to slip relative to the rotation of the arbor may increase, reducing the cutting or abrading effectiveness of the blade or disc.

Known fastening assemblies typically consist of a combination of at least a flange and a nut, and many times also include a spacer or washer disposed between the flange and nut. The flange functions to evenly distribute the clamping pressure of the tightened nut onto the object that is being secured and, in the case of a table saw, will reduce the occurrence of slippage. After placing the blade or disc onto the arbor, the flange is slid onto the arbor so as to abut the blade or disc. The spacer or washer is, if used, then slid onto the arbor to abut the flange. Finally, the nut is threaded over the arbor and is tightened against the flange or the spacer or washer.

Securing the blade or disk using fastening assemblies of the foregoing construction presents disadvantages. For example, in the case of a table saw, the arbor is typically located within the housing of the table saw and is largely inaccessible unless the housing is disassembled. As such, when fastening a blade or disc onto the arbor, the arbor must be located, and the flange, washer, and nut must be installed, largely by hand and using only the sense of touch as a guide. Such a process is time-consuming and prone to difficulty in quickly and successfully locating the arbor and securing the fastening assembly thereon. If one or more of the flange, nut, or washer/spacer are accidentally dropped into the housing of the saw, additional time is lost in retrieving the dropped elements. Accordingly, the known fastening assemblies do not provide an adequate solution to the objective of quickly and efficiently securing objects to a threaded spindle when limited space surrounds the spindle and the benefit of visual contact is absent.

The present invention is thus directed, in part, to a fastening apparatus which addresses, among others, the above-discussed needs and provides an apparatus for efficiently and effectively fastening a circular saw blade or abrading disc to the arbor of a table saw. Moreover, it will be appreciated that the present invention may be applied to the more general task of quickly and easily attaching an object of any type to a threaded spindle of any type.

SUMMARY OF THE INVENTION

In accordance with the present invention, there is provided a combined nut and flange fastener for fastening saw blades, cutting discs, or other such objects onto threaded spindles. The combined nut and flange fastener disclosed herein includes a nut portion and a flange portion, joined to each other for independent rotation. The flange portion has upper and lower regions with a bore running therethrough. The diameter of the bore is sized to accept a length of threaded spindle. The lower opening of the bore preferably is of a wider diameter than the bore itself and, preferably, ends in a tapered region that gradually tapers to meet the diameter of the bore. Such a construction aids the user to introduce the flange portion of the combined nut and flange fastener onto the threaded spindle using only the sense of touch. With the foregoing primary characteristics of the flange portion in mind, the flange portion of the present invention may have any configuration that functions to distribute the clamping pressure of the tightened nut portion to the object being secured on the threaded spindle.

The nut portion includes upper and lower regions with a bore running therethrough. The bore of the nut portion includes a threaded region and a non-threaded region sized to accept, and preferably closely communicate with, the exterior of the upper region of the flange portion. As such, when the nut portion is mated with the flange portion, the longitudinal axis of the threaded region of the bore in the nut portion and the longitudinal axis of the bore running through the flange portion are substantially aligned to define a bore that is unthreaded in one region and threaded in another region and that may engage and fasten to a length of threaded spindle. With the foregoing primary characteristics of the nut portion in mind, the nut portion may be any element that is constructed of metal or another durable material and that has a threaded bore that is designed to fit around and secure to the threaded spindle.

Further, both the exterior of the upper region of the flange portion and the non-threaded region of the nut portion preferably are provided with annular grooves positioned to align with each other so as to form an annular cavity when the flange portion is mated with the nut portion. A fastener such as, for example, a snap ring, is disposed within the annular cavity so as to rotatably couple the nut portion to the flange portion. Such a design allows the nut and flange portions to be secured and to define a single bore that is sized to accept and threadedly engage a length of threaded spindle, while permitting each of the nut and flange portions to rotate independently of the other. Although the present description of the invention includes a description of the foregoing arrangement for rotatably coupling the nut and flange portions, it will be understood that any suitable alternate arrangement may be used whereby the nut portion may rotate independently of the flange portion.

When used on, for example, a table saw, the combined nut and flange fastener of the present invention is introduced onto the saw's arbor, which is essentially a rotatable threaded spindle, to secure a circular saw blade or abrading disk onto the arbor. As the fastener is fitted over the arbor, the arbor first passes through the tapered region of the flange portion's bore, then passes through the unthreaded portion of the same bore, and continues through that bore until the arbor encounters the beginning of the threaded region of the nut portion. The nut portion of the fastener may then be rotated independent of the flange portion to thread the fastener onto the arbor. To aid in the threading the fastener onto the arbor, the exterior of the lower region of the nut portion preferably is substantially cylindrical and includes a series of vertical ridges or knurls to aid in grasping and gripping the nut portion with a human hand and to thereby facilitate hand-tightening of the fastener of the invention onto the arbor. The exterior of the upper region of the nut portion preferably also includes a flat-faced hexagonal region to aid in gripping the nut portion with pliers or a similar tightening implement to thereby facilitate securely fastening the fastener of the invention to the arbor.

The unthreaded region of the bore through the combined nut and flange fastener of the invention aids in retaining the fastener on the threaded spindle, and thereby prevents dropping the fastener into the table saw or other apparatus, should it be necessary for the operator to release his or her grip on the fastener before engaging the fastener's threads onto the spindle. That may occur when, for example, the operator must switch hands or obtain pliers or another tightening tool before engaging the threads. The unthreaded region of the bore also may provide the significant feature of aligning the threaded spindle within the fastener's bore so that the threaded region of the fastener's bore may be easily threaded onto the spindle by turning the nut portion. The distance provided between the upper, preferably hexagonally-shaped, region of the nut portion and the terminal, preferably tapered, region of the flange portion's bore also facilitates the operator's gripping of the upper region of the nut portion because the distance spaces apart the nut portion's upper region from the object that is being fastened to the spindle. Such a feature become all the more significant when the spindle is confined within a closed space and cannot easily be visually inspected.

It will be understood that in a basic form the present invention is directed to a fastener for securing an object to a threaded spindle and which includes at least the following elements. The invention includes a first portion having an upper region, a lower region having a first surface, and an unthreaded bore through the upper and lower regions and opening at a first end at the first surface. The present invention, in a basic form, further includes a second portion, also having upper and lower regions and a bore through the upper and lower regions. The portion of the bore within the second portion's upper region is threaded so as to threadingly mate with the threaded spindle, while the portion of the bore within the second portion's lower region is unthreaded and dimensioned to accept the upper region of the first portion. The bore through the first portion operates to accept the threaded spindle and preferably is dimensioned to generally align the threaded spindle with the threaded portion of the bore in the upper region of the second portion. The fastener of the invention, in a basic form, also includes a coupling rotatably connecting the lower region of the second portion about the upper region of the first portion so that the second portion may rotate and threadedly engage the threaded spindle independent of the movement of the first portion, allowing the first surface to be tightened against the object.

Accordingly, the present invention provides for a fastener that may be easily and quickly threaded onto the threaded spindle of an apparatus to secure an object to the spindle. The reader will appreciate these and other details, objects, and advantages of the present invention upon consideration of the following detailed description of embodiments of the invention, and may also comprehend such details, objects, and advantages of the invention upon practicing the invention.

BRIEF DESCRIPTION OF THE DRAWINGS

In the accompanying drawings, embodiments of the present invention are shown, wherein like reference numerals are employed to designate like elements and wherein.

DETAILED DESCRIPTION OF EMBODIMENTS OF THE PRESENT INVENTION

Figure 4:
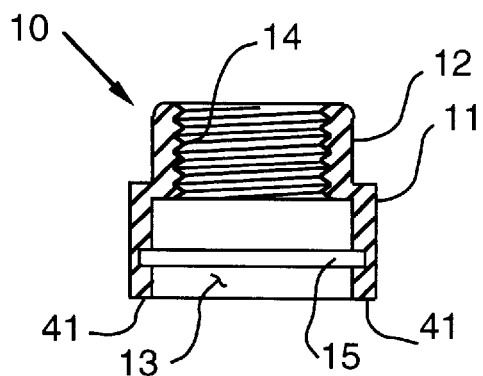
FIG. 4 is a side cut-away view of the nut portion 10 of the embodiment of FIG. 1.
Figure 5:
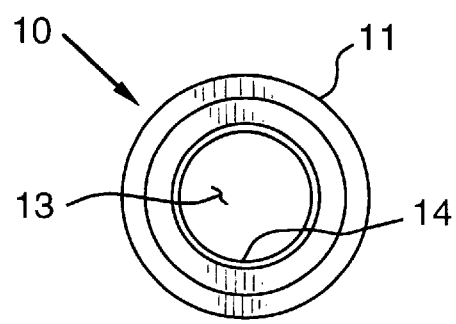
FIG. 5 is a bottom view of the nut portion 10 of the embodiment of FIG. 1.

Referring now to the drawings for the purposes of illustrating embodiments of the invention only, and not for purposes of limiting the same, the figures show a combined nut and flange fastener of the invention. More particularly, and with reference to FIG. 1, the combined nut and flange fastener is shown generally as 1. The preferred construction of the nut and flange fastener 1 of the present invention, as shown in FIGS. 2 and 4, includes a nut portion 10 and a flange portion 20, rotatably coupled by a snap ring 31 therebetween.

Although a snap ring is illustrated in the accompanying figures, persons of skill in the art will understand that other means of rotatably connecting the nut and flange portions 10 and 20, respectively, may be employed. Such alternate coupling elements include, for example, ball bearings. In addition, although the invention is disclosed as including a flange portion having a particular configuration, it will be understood that any equivalent element may be used that will act to distribute the force of the tightened nut portion 10 to the object being secured to the spindle.

The nut portion 10 preferably includes a generally hexagonal upper region 12 and a generally cylindrical lower region 11. The upper region 12 of the nut portion 10 preferably is generally hexagonal in shape to facilitate gripping with pliers, wrench, or other tightening tools. The lower region 11 of the nut portion 10 preferably is generally cylindrical in shape and may be provided with a series of raised vertical ridges or knurls 16 about its circumference to aid in gripping and turning the nut portion 10 with a human hand. A bore 13 runs through both the upper and lower regions 12 and 11, respectively, of the nut portion 10. As shown in FIG. 4, the length of the bore 13 that lies within the upper region 12 is provided with threads 14 sized to accept and communicate with the threaded end of a spindle, such as with threads 44 of spindle 43 of FIG. 8. The length of the bore 13 that lies within the lower region 11 is not threaded and is sized to accept the outer perimeter of the cylindrical region 22 of the flange portion 13, as described further below.

Figure 2:
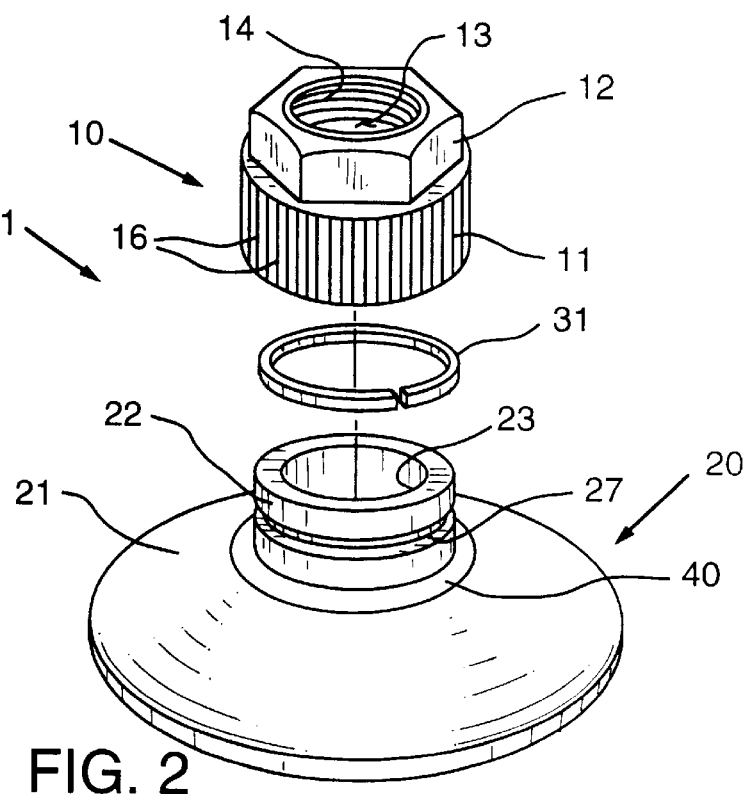
FIG. 2 is a perspective assembly view of the embodiment of FIG. 1.
Figure 3:
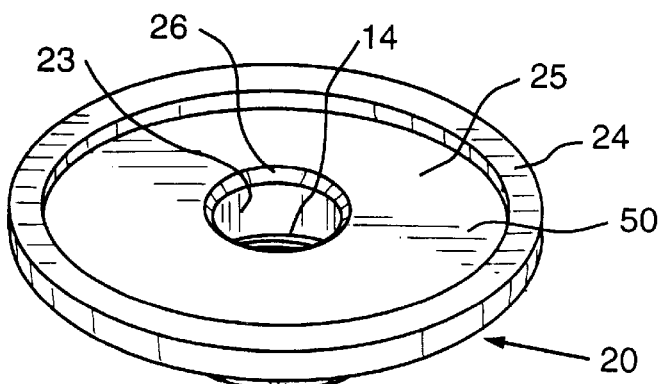
FIG. 3 is a bottom-side perspective view of the embodiment of FIG. 1.
Figure 6:
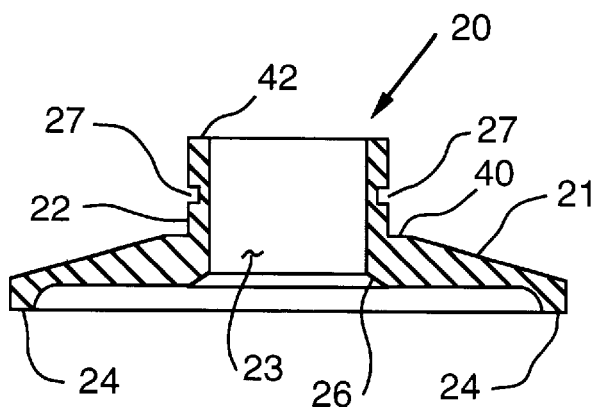
FIG. 6 is a side cut-away view of the flange portion 20 of the embodiment of FIG. 1.

As shown in FIGS. 2 and 6, the flange portion 20 preferably includes a generally cylindrical region 22 and a flared region 21, which preferably ends at a circular flat step 40 located intermediate the cylindrical and flared regions. The outer perimeter of the cylindrical region 22 of the flange portion 20 is shaped to fit in close communication within the bore 13 in the lower region 11 of the nut portion 10. The flared region 21 of the flange portion 20 preferably tapers outwardly from the flat step 40. As shown in FIGS. 3 and 6, surface 25 of the flange portion 20 preferably is generally perpendicular to the longitudinal axis of the bore 23 through the flange portion 20 and is preferably also provided with a raised outer lip 24 about its circumference. The clamping pressure of the nut portion is transferred to the outer lip 24 and is distributed to the object being clamped. The raised outer lip 24 also defines a recessed region 50. As the nut portion 10 is tightened against the flange portion 20, the recessed region 50 will slightly bow and will pre-tension the nut portion 10 and better secure the fastener 1. Unthreaded bore 23 runs through both the cylindrical and flared regions 22 and 21, respectively, of flange 20. The dimensions of bore 23 are such as to accept a threaded spindle, such as the arbor 28, in close communication therewith.

Figure 7:
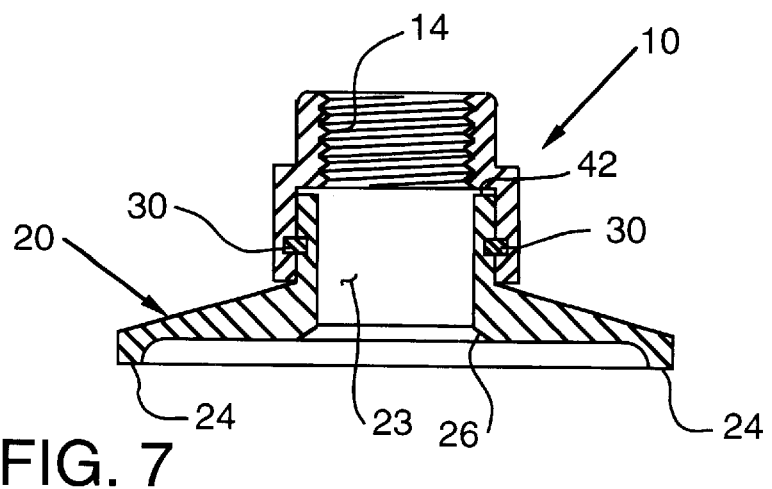
FIG. 7 is a side cut-away view of the embodiment of FIG. 1.

Similarly sized annular grooves 15 and 27 are provided in the nut and flange portions 10 and 20, respectively, as follows. The inner wall of the lower region 11 that defines bore 13 of nut portion 10 is provided with continuous annular groove 15. The outer surface of the flared region 21 of the flange portion 20 is also provided with a continuous annular groove 27. As shown in FIGS. 2 and 7, annular grooves 15 and 27, are positioned such that when the nut portion 10 is mated with the flange portion 20, grooves 15 and 27 are aligned to define a single continuous annular cavity 30. A fastener such as, for example, a metal snap ring 31 is inserted within one of the grooves 15 and 27, prior to mating of the nut portion 10 and the flange portion 20. In a preferred embodiment, snap ring 31 is a nearly circular ring that includes a gap in its circumference such that it can be elastically compressed to fit entirely within the space of one of annular groove 15 and 27 as the nut and flange portions 10 and 20 are mated. When the nut portion 10 and the flange portion 20 are positioned so as to define single annular cavity 30, the snap ring 31 will expand to its original size within the annular cavity 30 and will be partially disposed in both of annular groves 15 and 27. As such, the nut portion 10 and the flange portion 20 will be rotatably coupled and the nut portion 10 may rotate independently of the flange portion 20.

As shown in FIG. 7, the nut portion 10 and flange portion 20 preferably are dimensioned so that when mated, the bottom surface 41 of nut portion 10 abuts the flat step 40 of the flange portion 20 and a gap exists between the top surface 42 and the flange portion 20. Thus, as the nut portion 10 is threadedly advanced along a threaded spindle, it exerts pressure on the nut portion 10 at the interface of the nut portion's surface 41 and the flange portion's flat step 40.

Figure 1:
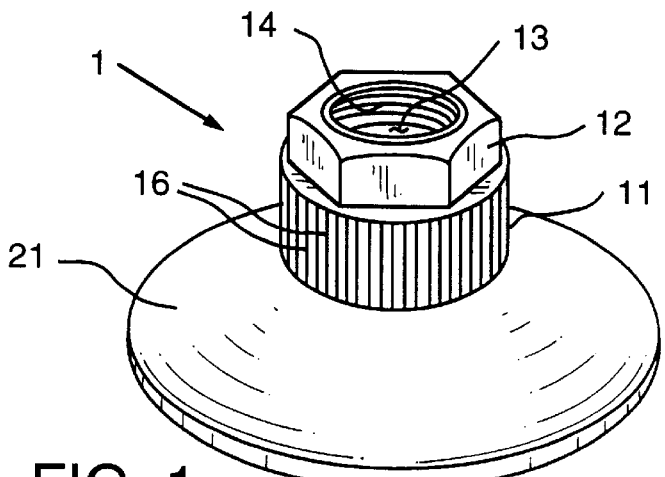
FIG. 1 is a top-side perspective view of an embodiment of the present invention.
Figure 9:
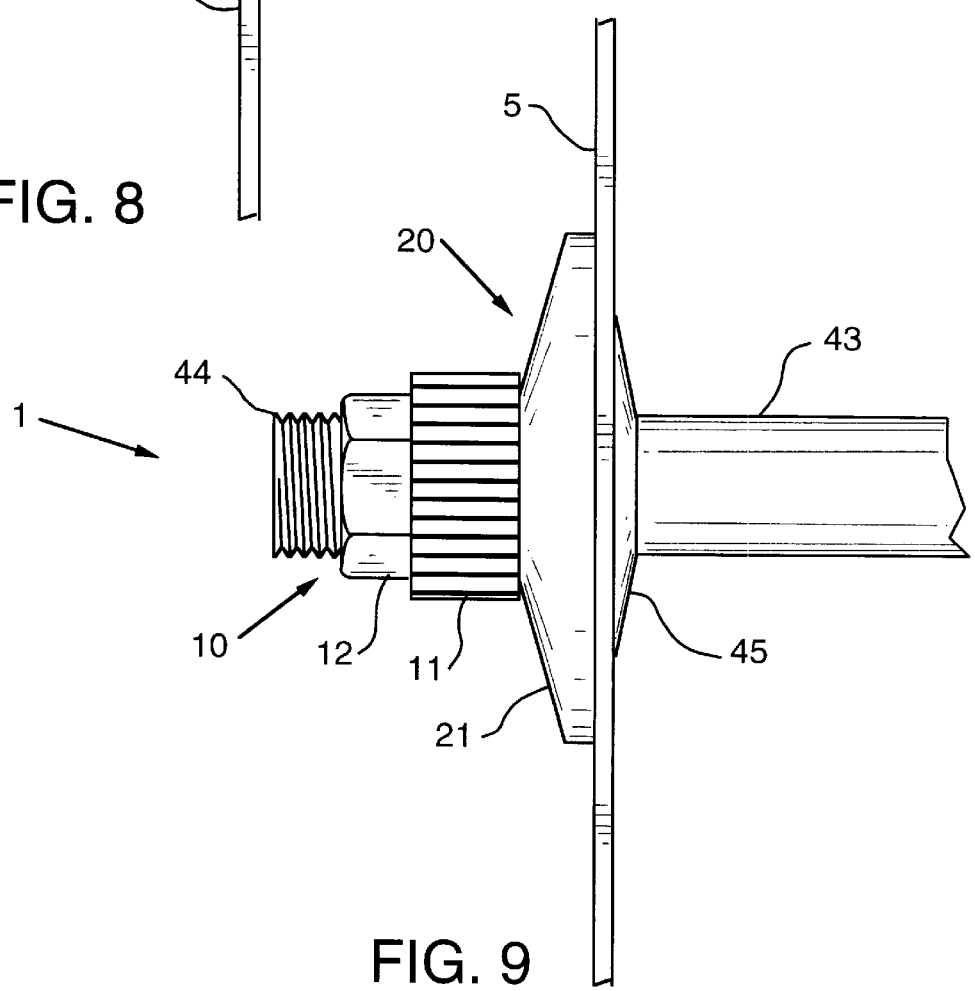
FIG. 9 is a side view of the embodiment of FIG. 1 in use on the arbor of FIG. 8.

Thus, as shown in FIGS. 1 and 9, once threaded onto a threaded spindle, for example arbor 43, the construction of nut portion 10 serves to space the hexagonal upper region 12 from the flared region 21 of the flange portion 20, thereby allowing the hexagonal upper region 12 to be rotated easily with pliers, or other suitable tightening tools, without also rotating the flange portion 20.

Figure 8:
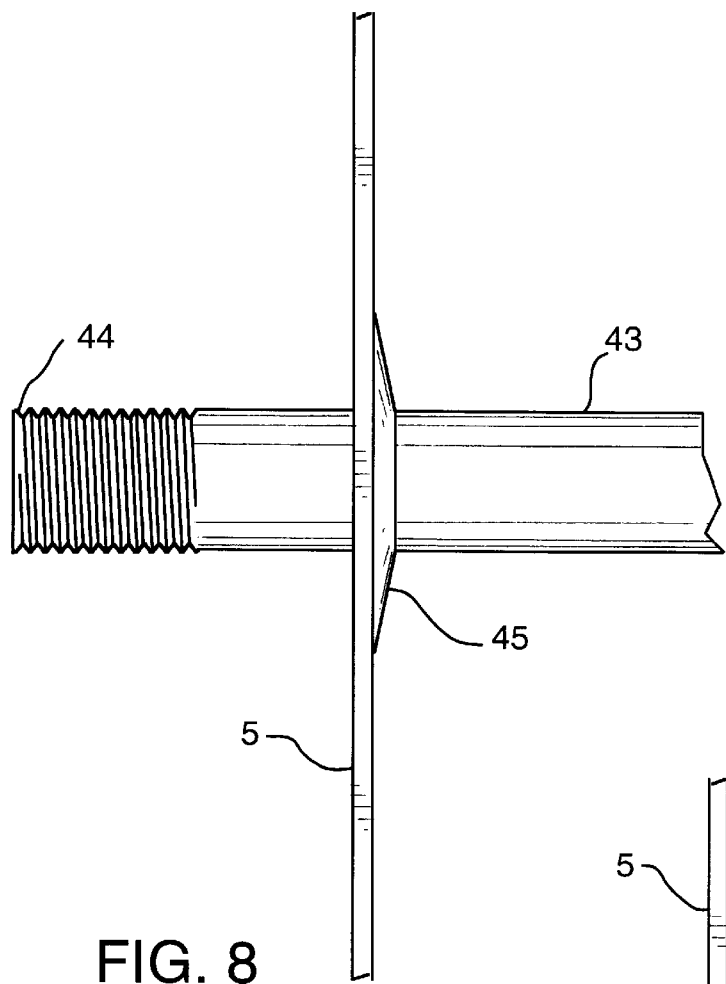
FIG. 8 is a side view of an arbor of a table saw with which the present invention may be used.

When used, for example, to secure a circular saw blade or abrading disk to the arbor of a table saw, the present invention allows the operator to secure the blade or disk to the arbor 43 with a single fastener, thereby eliminating the need for the operator to separately place a flange, a spacer or washer, and a nut onto the arbor. As seen in FIGS. 8 and 9, the operator first fits the blade or disk 5 onto the arbor 43 until the blade or disk 5 abuts against stationary blade stop 45. The operator then positions the combined nut and flange fastener 1 so that the terminal end of the arbor 44 is seated within the tapered lower opening 26 of the bore 23. The taper 26 on the lower opening will serve to guide the terminal end of the arbor 44 into the bore 23 in such a way that exact positioning of the bore 23 relative to the end of the arbor 44 is not necessary to initially introduce the terminal end of the arbor 44 into the bore 23. The operator then advances the combined nut and flange fastener 1 onto the arbor 44 until the arbor 43 occupies the entire length of bore 23 and the terminal end of the arbor 44 abuts the beginning of the threads 14 of the bore 13. At such point, the walls of the bore 23 mate closely about the arbor 44. As such, the terminal end of the arbor 44 is aligned with bore 13 to engage threads 14 of the bore 13 onto threads 43 of arbor 44.

Because the arbor 43 closely fits within the bore 23, the beginning of threads 14 of bore 13 and the end of the arbor 43 will be pre-aligned and any repositioning of the arbor 43 is unnecessary before rotating nut portion 10 to threadedly engage threads 44. In addition, rotation of the flange portion 20 is not necessary to threading the fastener 1 onto the threaded spindle due to the rotatable coupling of the nut portion 10 and the flange portion 20. When the nut portion 10 has been hand-threaded onto the arbor 44 such that the raised edge 24 of the flange member 20 abuts the blade or disk 5, pliers, a wrench, or another suitable tightening tool (not pictured) may be used to turn the hexagonal upper region 12 of the nut portion 10 to continue threading the nut portion 10 onto the arbor 43 until sufficient clamping tension is applied to the blade or disk 5. It will be understood that the clamping force exerted by the nut portion 10 on the blade or disk 5 is concentrated in the raised outer lip 24 of the flange member 20, and thus the force exerted on the blade or disk 5 is maximized.

Those of ordinary skill in the art will, of course, appreciate that various changes in the details, materials and arrangements of parts which have been herein described and illustrated in order to explain the nature of the invention may be made by those skilled in the art within the principle and scope of the invention as expressed in the appended claims. For example, although the foregoing description has in instances described use of the invention to fasten a circular saw blade or disk onto the arbor of a table saw, it will be readily appreciated that the fastener of the present invention may be used with advantage in any application wherein an object is threadedly fastened to a threaded cylindrical member such as a spindle, rod, or axle.

What is claimed is:

1. A fastener for placement on a threaded member to secure an object to the threaded member, the fastener comprising:

a first member comprising a first region, a second region having a surface, and an unthreaded first bore through said first region and said second region and opening at said surface, said first bore having a circular cross-section;

a second member comprising a primary region, a secondary region, and a second bore through said primary region and said secondary region, the portion of said second bore within said primary region being threaded, the portion of said second bore within said secondary region being unthreaded and dimensioned to accept said first region of said first portion, said secondary region being rotatable connected to said first region.

2. A fastener for threaded engagement of a threaded member, the fastener comprising:

a flange portion comprising a first region, a second region having a surface, and a first bore therethrough opening at a first end at said surface, said first bore having a circular cross-section;

a nut portion comprising a primary region and a secondary region and having a second bore therethrough, said second bore receiving said first region of said flange portion, said flange portion being rotatable connected to said nut portion.

3. The fastener of claim 2 wherein:

said secondary region of said nut portion includes an annular groove;

said first region of said flange portion includes an annular groove, said annular groove of said secondary region and said annular groove of said first region positioned to communicate and form an annular cavity; and a snap ring disposed within said annular cavity to rotatably connect said nut portion and said flange portion.

4. The fastener of claim 2, wherein said second bore in said secondary region of said nut portion is of greater diameter than said second bore in said primary region of said nut portion.

5. The fastener of claim 4, wherein said second bore in said primary region of said nut portion and said second bore in said secondary region of said nut portion co-axially communicate.

6. The fastener of claim 2, wherein said second bore in said primary region of said nut portion and said first bore co-axially communicate.

7. The fastener of claim 6, wherein said second bore in said primary region of said nut portion and said first bore are of equal diameter.

8. The fastener of claim 2, wherein said first bore tapers outward at said first end.

9. The fastener of claim 2, wherein said surface of said flange portion includes a perimeter having a raised portion thereon.

10. The fastener of claim 2, wherein said primary region of said nut portion is hexagonal in cross-section.

11. The fastener of claim 2, wherein said secondary region of said nut portion is circular in cross-section and includes a plurality of ridges thereon.

12. The fastener of claim 1, wherein said first bore and said second bore co-axially communicate.

13. The fastener of claim 12, wherein said second bore in said primary region of said second member and said first bore are of equal diameter.

14. The fastening device of claim 1, wherein said first bore tapers outward at said first end.

15. The fastener of claim 1, wherein said surface of said first member includes a perimeter having a raised portion thereon.

16. The fastener of claim 1, wherein said primary region of said second member is hexagonal in cross-section.

17. The fastener of claim 1, wherein said secondary region of said second member is circular in cross-section and includes a plurality of ridges thereon.

18. The fastener of claim 1, wherein:

said first region includes a first annular groove;

said secondary region includes a second annular groove;

said first annular groove and said second annular groove communicate to form an annular cavity; and a connecting member is disposed within said annular cavity to rotatably connect said first member and said second member.

19. The fastener of claim 18, wherein said connecting member is a snap ring.

20. A fastener comprising:

a flange portion comprising an upper region, a lower region having a first surface, and a first bore therethrough opening at a first end at said first surface, said upper region of said flange portion including an annular groove;

a nut portion comprising an upper region and a lower region and having a second bore through said upper region and said lower region, said a second bore sized to accept said upper region of said flange portion in close communication therewith, said lower region of said nut portion including an annual groove;

said annular groove of said lower region of said nut portion and said annular groove of said upper region of said flange portion communicating to form an annular cavity; and a snap ring disposed within said annular cavity and rotatably connecting said flange portion and said nut portion.

21. A fastener comprising:

a flange portion comprising an upper region, a lower region having a first surface, and a first bore therethrough opening at a first end at said first surface, said upper region of said flange portion including an annular groove;

a nut portion comprising an upper region and a lower region and having a second bore through said upper region and said lower region, said a second bore sized to accept said upper region of said flange portion in close communication therewith, said lower region of said nut portion including an annual groove;

said annular groove of said lower region of said nut portion and said annular groove of said upper region of said flange portion communicating to form an annular cavity; and a connecting member disposed within said annular cavity rotatably connecting said flange portion and said nut portion.

22. A fastener comprising:

a flange portion comprising an upper region, a lower region having a first surface, and a bore therethrough opening at a first end at said first surface;

a nut portion comprising an upper region having a bore therethrough sized to accept said upper region of said flange portion in close communication therewith; and a joining assembly rotatably connecting said nut portion and said flange portion, an opening of said bore of said flange portion at said first surface being wider than a diameter of said bore within said flange portion, said bore of said flange portion including a tapered portion tapering from said first surface to said diameter of said bore within said flange portion.

23. A fastener comprising:

a flange portion comprising an upper region, a lower region having a first surface, and a bore therethrough opening at a first end at said first surface, said first surface having a perimeter, a raised portion being disposed about said perimeter;

a nut portion comprising an upper region and a lower region and having a bore therethrough sized to accept said upper region of said flange portion in close communication therewith; and a joining assembly rotatably connecting said nut portion and said flange portion, an opening of said bore of said flange portion at said first surface being wider than a diameter of said bore within said flange portion, said bore of said flange portion including a tapered portion tapering from said first surface to said diameter of said bore within said flange portion.

24. A fastener comprising:

a flange portion comprising an upper region, a lower region having a first surface, and a bore therethrough opening at a first end at said first surface;

a nut portion comprising an upper region and a lower region and having a bore therethrough sized to accept said upper region of said flange portion in close communication therewith, said lower region of said nut portion being circular in cross-section and having a plurality of ridges disposed thereon.

25. A fastener for placement on a threaded member to secure an object to the threaded member, the fastener comprising:

a first member comprising a first region, a second region having a surface, and a first bore through said first and second regions and opening at said surface;

a second member comprising a primary region, a secondary region, and a second bore through said primary region and said secondary region, the portion of said second bore within said primary region being threaded, the portion of said second bore within said secondary region receiving said first region, said secondary region being rotatably connected to said first region prior to installation of the fastener on the threaded member.

26. A fastener for placement on a threaded member to secure an object to the threaded member, the fastener comprising:

a first member comprising a first region, a second region having a surface, and a first bore through said first and second regions and opening at said surface;

a second member comprising a primary region, a secondary region, and a second bore through said primary region and said secondary region, the portion of said second bore within said primary region being threaded, the portion of said second bore within said secondary region receiving said first region; and a connecting member separate from said first member and said second member rotatably connecting said first member and said second member.

* * * * *

UNITED STATES PATENT AND TRADEMARK OFFICE
CERTIFICATE OF CORRECTION

PATENT NO. : 5,902,084
DATED : May 11, 1999
INVENTOR(S) : James E. Garcia

It is certified that error appears in the above-indentified patent and that said Letters Patent is hereby corrected as shown below:

In claim 1, line 16, delete "rotatable" and substitute therefor -- rotatably --.

In claim 2, line 10, delete "rotatable" and substitute therefor -- rotatably --.

Signed and Sealed this

Sixth Day of March, 2001

Attest:

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

Page 1 of 1

PATENT NO. : 5,902,084
DATED : May 11, 1999
INVENTOR(S) : Garcia

It is certified that error appears in the above-identified patent and that said Letters Patent is hereby corrected as shown below:

<u>Column 6,</u>
Line 62, delete "portion" and substitute -- member -- therefor.

<u>Column 7,</u>
Line 46, delete "said" and substitute -- a -- therefor.

<u>Column 8,</u>
Line 41, delete "upper" and substitute -- lower -- therefor.

Signed and Sealed this

Fourth Day of December, 2001

Attest:

NICHOLAS P. GODICI
*Acting Director of the United States Patent and Trademark Office*

*Attesting Officer*